(12) United States Patent
Smith et al.

(10) Patent No.: US 11,614,106 B2
(45) Date of Patent: Mar. 28, 2023

(54) PARTIALLY SUBMERGED PERIODIC RIBLETS

(71) Applicant: Lockheed Martin Corporation, Bethesda, MD (US)

(72) Inventors: Brian R. Smith, Colleyville, TX (US); Patrick J. Yagle, Fort Worth, TX (US); Paul Douglas McClure, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 885 days.

(21) Appl. No.: 16/547,351

(22) Filed: Aug. 21, 2019

(65) Prior Publication Data
US 2021/0054859 A1 Feb. 25, 2021

(51) Int. Cl.
*B64C 1/38* (2006.01)
*F15D 1/00* (2006.01)

(52) U.S. Cl.
CPC .................. *F15D 1/004* (2013.01)

(58) Field of Classification Search
USPC ........................................... 138/39; 244/130
See application file for complete search history.

(56) References Cited

U.S. PATENT DOCUMENTS

| | | |
|---|---|---|
| 2,261,558 A | 11/1941 | Orloff |
| 2,800,291 A | 7/1957 | Stephens |
| 2,980,370 A * | 4/1961 | Takacs ................... F42B 12/02 244/1 N |
| 3,578,264 A | 5/1971 | Kuethe |
| 4,004,615 A * | 1/1977 | Stern ...................... F16L 57/06 55/435 |

(Continued)

FOREIGN PATENT DOCUMENTS

| | | |
|---|---|---|
| DE | 3609541 A1 | 9/1987 |
| DE | 102006023557 A1 | 11/2007 |

(Continued)

OTHER PUBLICATIONS

Smith, B. R. et al., "Submberged Periodic Riblets," U.S. Appl. No. 16/547,304, filed Aug. 21, 2019, 34 pages.

(Continued)

*Primary Examiner* — James F Hook
(74) *Attorney, Agent, or Firm* — Baker Botts L.L.P.

(57) ABSTRACT

In one embodiment, a method for reducing drag includes forming a smooth surface on a first portion of a physical object. The method also includes forming periodic riblets on a second portion of the physical object. The method further includes generating a flow over the periodic riblets of the second portion of the physical object and over the smooth surface of the first portion of the physical object. The second portion of the physical object is adjacent to the first portion of the physical object. Each peak of each riblet of the periodic riblets of the second portion of the physical object is located above a plane of the smooth surface of the first portion of the physical object. Each valley between adjacent riblets of the periodic riblets of the second portion of the physical object is located below the plane of the smooth surface of the first portion of the physical object. A length of each riblet of the periodic riblets runs parallel to a direction of the flow.

20 Claims, 7 Drawing Sheets

(56) References Cited

U.S. PATENT DOCUMENTS

| | | |
|---|---|---|
| 4,284,302 A | 8/1981 | Drews |
| 4,455,045 A | 6/1984 | Wheeler |
| 4,706,910 A | 11/1987 | Walsh |
| 4,750,693 A | 6/1988 | Löbert et al. |
| 4,753,401 A | 6/1988 | Bechert |
| 4,776,535 A * | 10/1988 | Paterson ............... B64C 23/00 296/180.1 |
| 4,830,315 A | 5/1989 | Presz, Jr. et al. |
| 4,907,765 A | 3/1990 | Hirschel et al. |
| 5,052,963 A | 10/1991 | Johnson, III |
| 5,114,099 A | 5/1992 | Gao |
| 5,171,623 A | 12/1992 | Yee |
| 5,378,524 A | 1/1995 | Blood |
| 5,481,996 A | 1/1996 | Osawa et al. |
| 5,598,990 A | 2/1997 | Farokhi et al. |
| 5,833,389 A * | 11/1998 | Sirovich ............... B64C 21/10 405/80 |
| 5,988,568 A | 11/1999 | Drews |
| 6,345,791 B1 | 2/2002 | McClure |
| 6,880,476 B2 | 4/2005 | Olsen et al. |
| 7,604,461 B2 | 10/2009 | Bonnet |
| 8,226,038 B2 | 7/2012 | Smith et al. |
| 8,276,851 B2 | 10/2012 | McKeon |
| 8,323,775 B2 | 12/2012 | van Merkstoijn |
| 8,444,092 B2 | 5/2013 | Li et al. |
| 8,535,781 B2 | 9/2013 | Van Merksteijn |
| 9,188,287 B2 | 11/2015 | Krautschick et al. |
| 9,340,281 B2 | 5/2016 | Harrison et al. |
| 9,482,096 B1 | 11/2016 | Paesano et al. |
| 2009/0217981 A1* | 9/2009 | Extrand ............. F16K 99/0017 134/22.18 |
| 2010/0180972 A1* | 7/2010 | Yoon ...................... F16L 9/006 244/130 |
| 2011/0198444 A1 | 8/2011 | Dong |
| 2015/0231946 A1* | 8/2015 | Bianchi ................. F24F 13/24 264/267 |
| 2016/0194076 A1 | 7/2016 | Van Merksteijn |
| 2018/0030996 A1 | 2/2018 | Schilling et al. |
| 2018/0229808 A1 | 8/2018 | Wang et al. |

FOREIGN PATENT DOCUMENTS

| | | |
|---|---|---|
| EP | 2 270 312 A1 | 1/2011 |
| EP | 2 270 312 A9 | 1/2011 |
| EP | 2 982 599 A1 | 2/2016 |
| WO | 8403867 A1 | 10/1984 |
| WO | 2008089790 A1 | 7/2008 |

OTHER PUBLICATIONS

Smith, B. R. et al., "Staggered Periodic Riblets," U.S. Appl. No. 16/547,378, filed Aug. 21, 2019, 41 pages.

European Patent Office communication re Application No. 20190584.1-1004 (JL108323P.EPP), dated Jun. 24, 2022.

European Patent Office communication re Application No. 20190584.1-1010, dated Jan. 21, 2021.

* cited by examiner

PARTIALLY SUBMERGED PERIODIC RIBLETS

TECHNICAL FIELD

This disclosure generally relates to riblets, and more specifically to partially submerged periodic riblets.

BACKGROUND

An object (e.g., an aircraft or a marine vessel) that moves through a fluid (e.g., air or water) experiences a drag force. An increase in the drag force experienced by the object increases the energy required for the object to move through the fluid. For example, an increase in the drag force experienced by an aircraft moving at an established speed may increase the power required by the aircraft to move through the air at the same established speed. Thus, drag force has a significant impact of aircraft fuel consumption and aircraft range.

SUMMARY

According to an embodiment, a method for reducing drag includes forming a smooth surface on a first portion of a physical object. The method also includes forming periodic riblets on a second portion of the physical object. The method further includes generating a flow over the periodic riblets of the second portion of the physical object and over the smooth surface of the first portion of the physical object. The second portion of the physical object is adjacent to the first portion of the physical object. Each peak of each riblet of the periodic riblets of the second portion of the physical object is located above a plane of the smooth surface of the first portion of the physical object. Each valley between adjacent riblets of the periodic riblets of the second portion of the physical object is located below the plane of the smooth surface of the first portion of the physical object. A length of each riblet of the periodic riblets runs parallel to a direction of the flow.

According to another embodiment, a physical object includes a first portion having a smooth surface. The physical object further includes a second portion having periodic riblets. The second portion of the physical object is adjacent to the first portion of the physical object. Each peak of each riblet of the periodic riblets of the second portion of the physical object is located above a plane of the smooth surface of the first portion of the physical object. Each valley between adjacent riblets of the periodic riblets of the second portion of the physical object is located below the plane of the smooth surface of the first portion of the physical object.

According to yet to another embodiment, a method of manufacturing a physical object includes forming a smooth surface on a first portion of a physical object. The method further includes forming periodic riblets on a second portion of the physical object. The second portion of the physical object is adjacent to the first portion of the physical object. Each peak of each riblet of the periodic riblets of the second portion of the physical object is located above a plane of the smooth surface of the first portion of the physical object. Each valley between adjacent riblets of the periodic riblets of the second portion of the physical object is located below the plane of the smooth surface of the first portion of the physical object.

Technical advantages of this disclosure may include one or more of the following. The use of partially submerged ribbed surfaces on physical objects reduces overall drag (which includes pressure and viscous drag) experienced by the physical object as compared to physical objects having a smooth surface or protruding ribbed surface, which may significantly reduce fuel costs since less power is required to move the object through the fluid (e.g., gas or liquid). The drag reduction experienced by physical objects such as an aircraft that use partially submerged ribbed surfaces may also increase the range (i.e., the maximum distance the aircraft can fly between takeoff and landing) of the physical object as compared to physical objects that have a smooth surface. In certain embodiments, the drag reduction may allow higher maximum speeds to be obtained for a fixed propulsion input. In some embodiments, partially submerged periodic riblets may reduce heat transfer on a hot or cold surface adjacent to a turbulent boundary layer, which may reduce the insulation required in particular applications. The use of partially submerged periodic riblets may delay or prevent the separation of the flow in a turbulent boundary layer from the surface, which may reduce aerodynamic drag, increase lift on a physical object (e.g., an aircraft wing), and/or improve the performance of propulsion systems.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Embodiments of this disclosure describe physical objects having partially submerged periodic riblets that may be used to reduce drag, which includes pressure drag and friction drag, over the surfaces of the physical objects. Riblets are very small (e.g., less than a hundredth of an inch in depth) grooves or channels on a surface of a physical object (e.g., a vehicle). The riblets run parallel to the direction of flow. Partially submerged periodic riblets are regions with riblets that are partially submerged below a smooth surface of the object. The regions having partially submerged periodic riblets may be followed by a short section of a smooth surface. This intermittent pattern may be repeated for the length of the surface of the object.

While conventional riblets that protrude above the surface of the object reduce drag by suppressing near wall turbulent structures, conventional riblets also increase the wetted area. The concept of the partially submerged periodic riblets disclosed herein relies on the fact that that the damping of turbulent structures persists beyond the end of the riblet section, which reduces drag over the riblet and smooth regions. Alternating the smooth and riblet regions reduces drag by reducing the wetted area. Partially submerging the riblets reduces pressure drag in the transition regions between the smooth surface and the riblet surface as compared to protruding periodic or variable height riblets. The riblets are partially submerged to create a constant cross sectional area between the smooth and riblet regions. As such, embodiments of this disclosure use partially submerged periodic riblets to reduce the pressure drag penalty of the periodic riblet concept relative to the protruding periodic riblets.

Figure 2A:
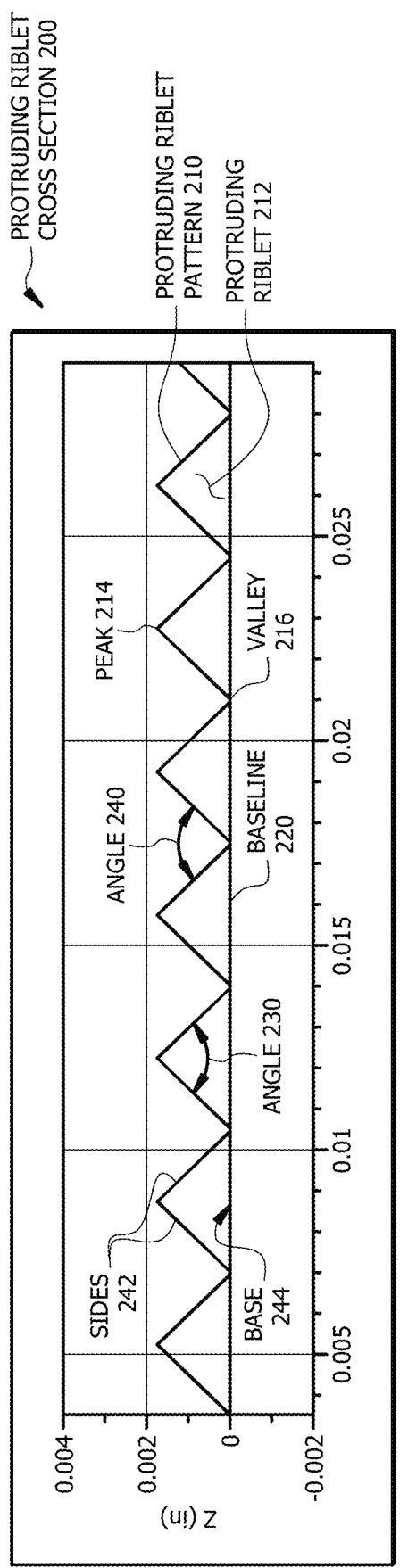
FIG. 2A illustrates a cross section of a protruding riblet pattern, in accordance with an example embodiment.
Figure 2B:
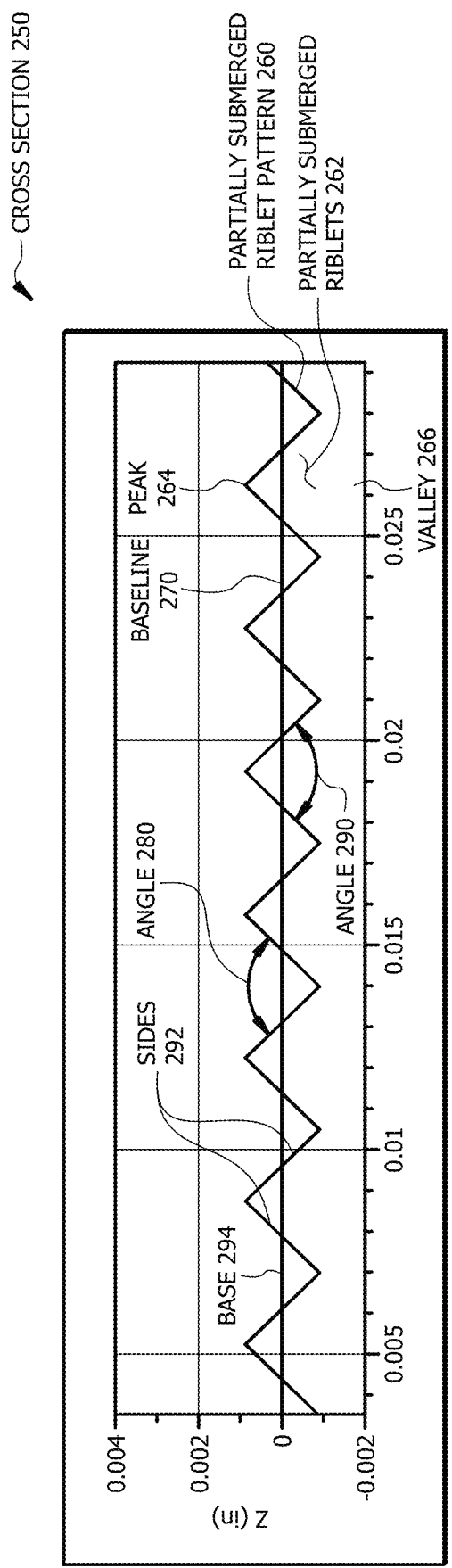
FIG. 2B illustrates a cross section of a partially submerged riblet pattern, in accordance with an example embodiment.
Figure 3A:
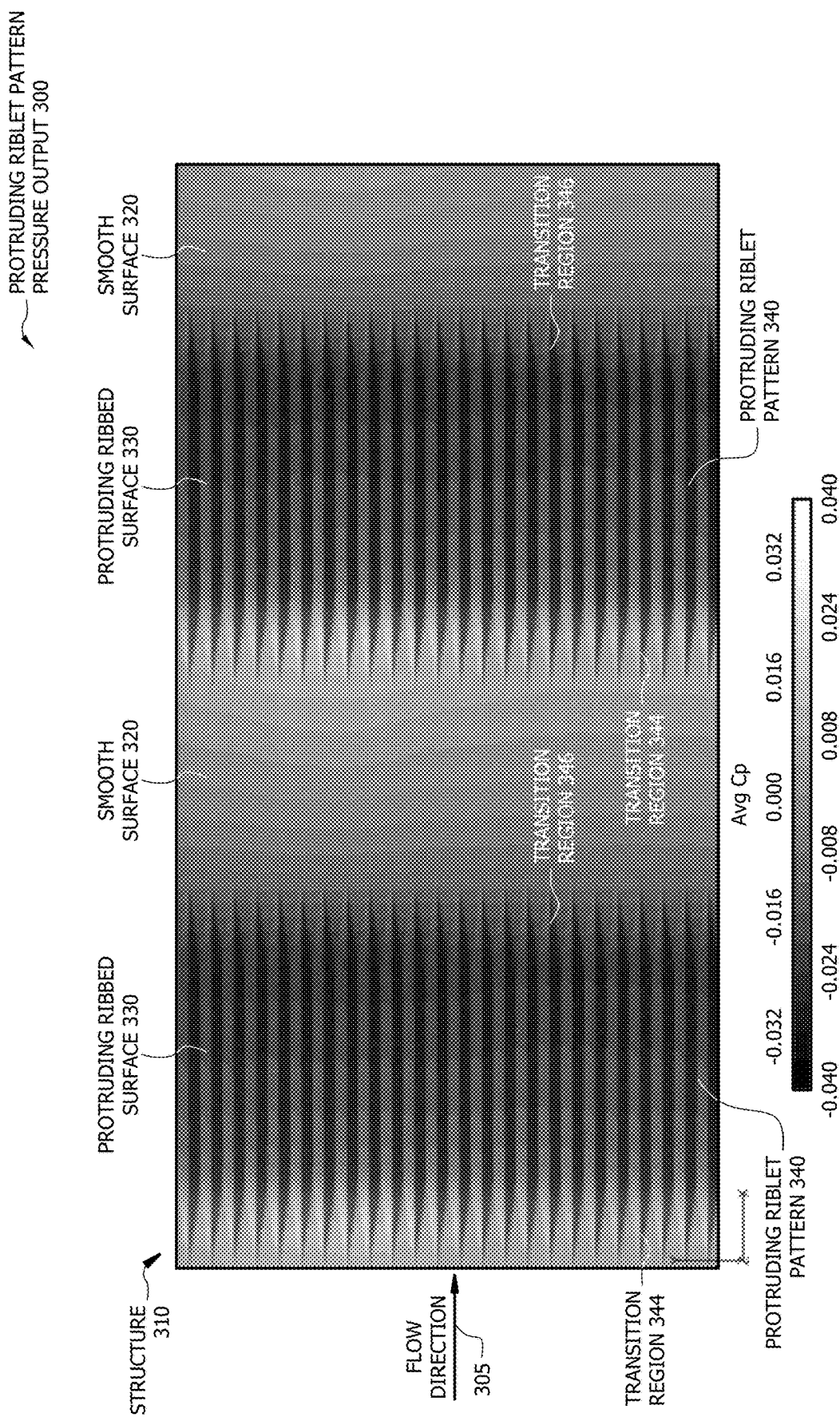
FIG. 3A illustrates a pressure output pattern associated with a physical object having a protruding riblet pattern, in accordance with an example embodiment.
Figure 3B:
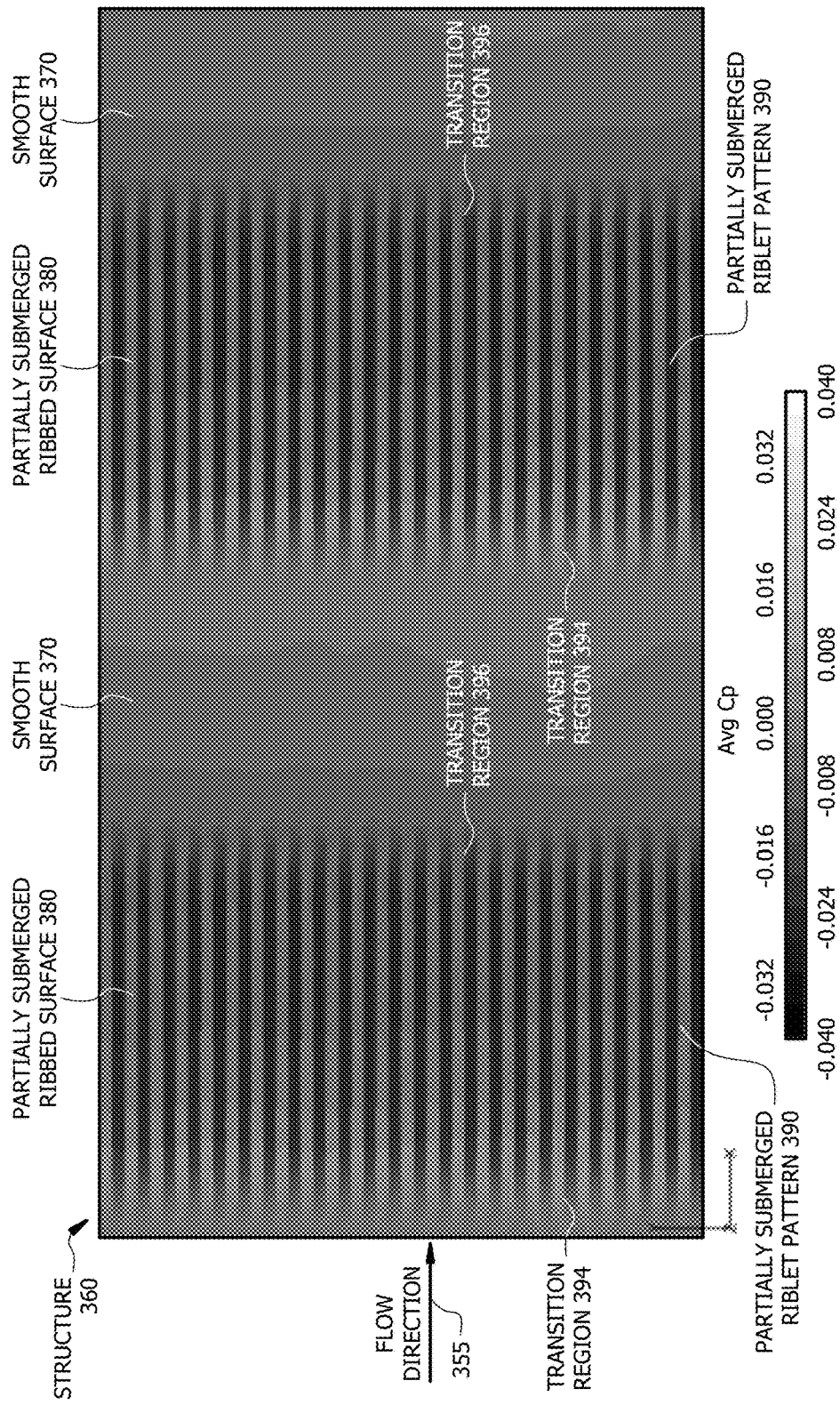
FIG. 3B illustrates a pressure output pattern associated with a physical object having a partially submerged riblet pattern, in accordance with an example embodiment.
Figure 4:
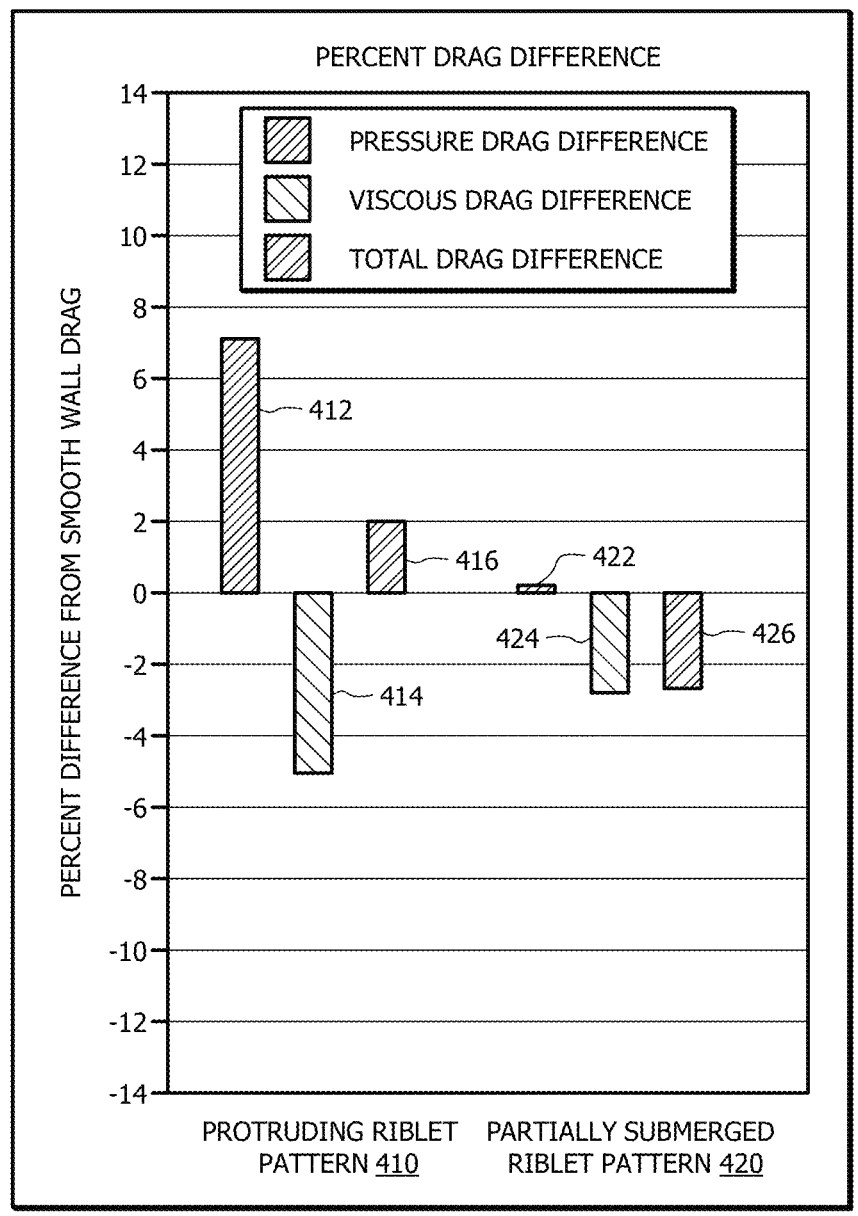
FIG. 4 illustrates a bar chart that compares drag produced by a physical object having a protruding riblet pattern to a physical object having a partially submerged riblet pattern, in accordance with an example embodiment.
Figure 5:
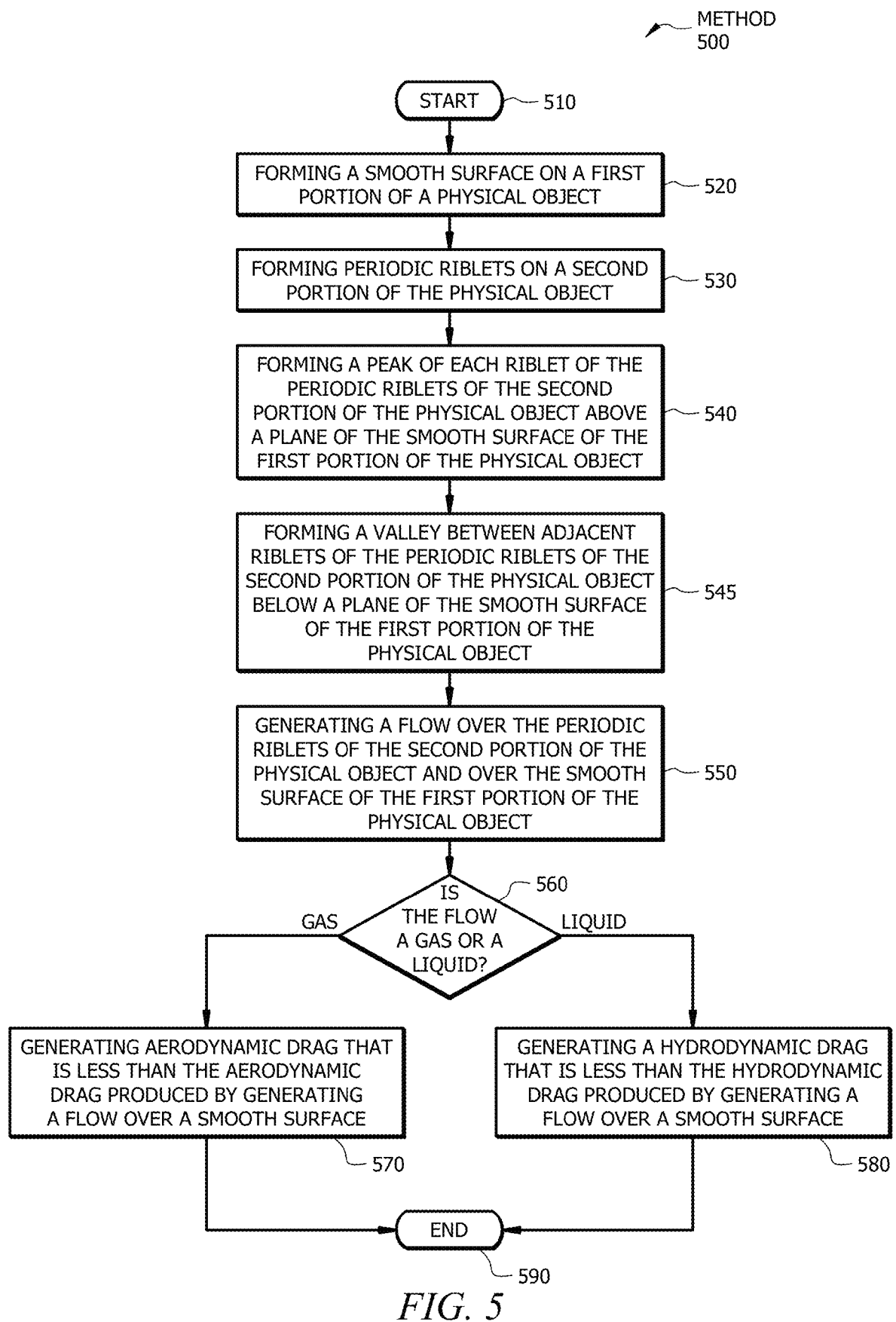
FIG. 5 illustrates an example method for reducing drag on a surface using a partially submerged riblet pattern, in accordance with an example embodiment.

FIGS. 1 through 5 show example apparatuses and methods associated with partially submerged periodic riblets. FIG. 1A shows an example physical object with partially submerged periodic riblets and FIG. 1B shows an example longitudinal section of the physical object of FIG. 1A. FIG. 2A shows an example cross section of a protruding riblet pattern and FIG. 2B shows an example cross section of a partially submerged riblet pattern. FIG. 3A shows an example pressure output pattern associated with a physical object having a protruding riblet pattern and FIG. 3B shows an example pressure output pattern associated with a physical object having a partially submerged riblet pattern. FIG. 4 shows an example bar chart that compares drag produced by a physical object having a protruding riblet pattern to a physical object having a partially submerged riblet pattern. FIG. 5 shows an example method for reducing drag on a surface using a partially submerged riblet pattern.

Figure 1A:
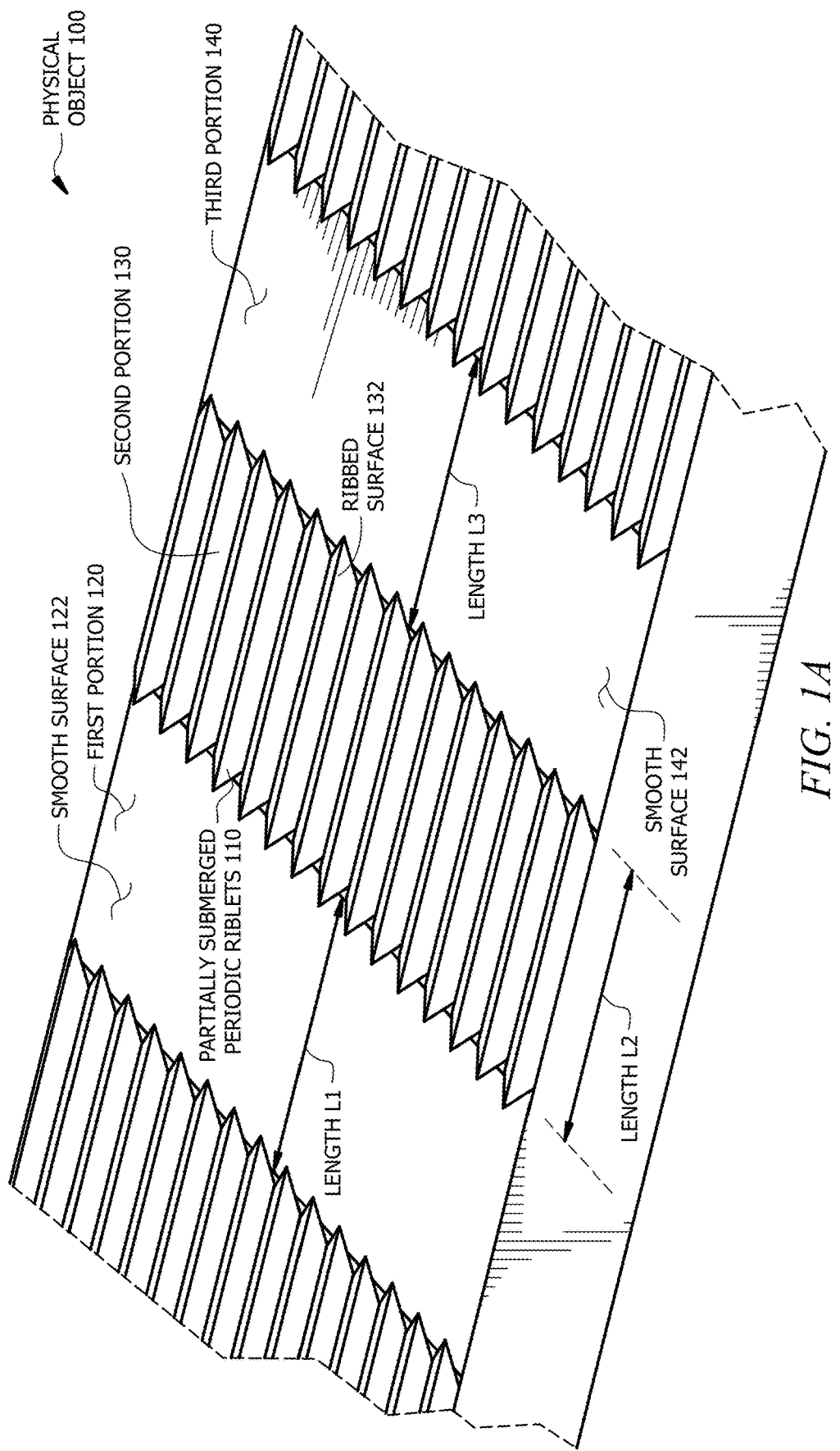
FIG. 1A illustrates a physical object with partially submerged periodic riblets, in accordance with an example embodiment.

FIG. 1A illustrates an example physical object 100 having partially submerged periodic riblets 110. Physical object 100 with partially submerged periodic riblets 110 may be used to reduce overall drag (e.g., aerodynamic or hydrodynamic drag) over a surface as compared to a physical object 100 without partially submerged periodic riblets 110 or a physical object with protruding periodic riblets (e.g., protruding riblets 212 of FIG. 2A.) One or more portions of physical object 100 may be made of steel, aluminum, copper, titanium, nickel, plastic, fiberglass, a combination thereof, or any other suitable material.

Physical object 100 is any object that is susceptible to drag (e.g., skin friction drag and pressure drag.) For example, physical object 100 may be a component (e.g., a portion of an outer body) of an aircraft (e.g., an airplane, a helicopter, a blimp, a drone, etc.), a component of a marine vessel (e.g., a cargo ship, a passenger ship, a canoe, a raft, etc.), a component of a motorized vehicle (e.g., a truck, a car, a train, a scooter, etc.), a component of a non-motorized vehicle (e.g., a bicycle, a skateboard, etc.), a component of a spacecraft (e.g., a spaceship, a satellite, etc.), a wind turbine, a projectile (e.g., a missile), or any other physical object that is capable of experiencing drag. In certain embodiments, drag may be generated by a force acting opposite to the relative motion of physical object 100 (e.g., a wing of an aircraft) moving with respect to a surrounding fluid (e.g., air). In some embodiments, drag is generated by the viscosity of gas. In certain embodiments, drag may be generated due to the viscosity of a fluid (e.g., water) near the surface of physical object 100 (e.g., a section of a pipe or duct.)

Physical object 100 of FIG. 1A includes a first portion 120, a second portion 130, and a third portion 140. First portion 120 has a smooth surface 130, second portion 130 has a ribbed surface 132, and third portion 140 has a smooth surface 142. In certain embodiments, smooth surface 122 of first portion 120 and/or smooth surface 142 of third portion 140 is flat. In some embodiments, smooth surface 122 of first portion 120 and/or smooth surface 142 of third portion 140 may have a curvature. In the illustrated embodiment of FIG. 1A, smooth surface 122 of first portion 120 of physical object 100 is along a same plane as smooth surface 142 of third portion 140 of physical object 100. Second portion 120 of physical object 100 includes partially submerged periodic riblets 110. Partially submerged periodic riblets 110 of second portion 130 form ribbed surface 132.

Partially submerged periodic riblets 110 of second portion 130 of physical object 100 span from first portion 120 of physical object 100 to third portion 140 of physical object 100. Each partially submerged periodic riblet 110 of physical object 100 is partially depressed below a plane (e.g., plane 180 of FIG. 1B) of smooth surface 122 of first portion 120 such that an upper portion of each partially submerged periodic riblet 110 extends beyond the plane of smooth surface 122 of first portion 120 in a direction away from physical object 100. In certain embodiments, a cross sectional area of the upper portion of partially submerged periodic riblets 110 above the plane of smooth surface 122 of first portion 120 of physical object 100 is approximately (within ten percent) equal to a cross sectional area of a void created by partially submerged periodic riblets 110 below the plane of smooth surface 122 of first portion 120 of physical object 100.

Each partially submerged periodic riblet 110 includes a peak 112. Each peak 112 of each partially submerged periodic riblet 110 is a location (e.g., a point, a plane, a ridge, etc.) along an exterior surface of partially submerged periodic riblet 110 that is farthest away from the plane of smooth surface 122 in a direction away from physical object 100. In the illustrated embodiment of FIG. 1A, peaks 112 of partially submerged periodic riblets 110 extend a predetermined distance (e.g., 0.001 inches) above the plane of smooth surface 122 of physical object 100. In some embodiments, one or more peaks 112 of one or more partially submerged periodic riblets 110 may form a pointed tip. In some embodiments, one or more peaks 112 of one or more partially submerged periodic riblets 110 may form a flat or rounded peak surface.

The intersections of adjacent partially submerged periodic riblets 110 create valleys 114. Each valley 114 between adjacent partially submerged periodic riblets 110 is a point along an exterior surface of partially submerged periodic riblet 110 that is farthest away from the plane of smooth surface 122 in a direction toward physical object 100. In the illustrated embodiment of FIG. 1A, valleys 114 of partially submerged periodic riblets 110 are located a predetermined distance (e.g., 0.001 inches) below the plane of smooth surface 122 of physical object 100. In some embodiments, partially submerged periodic riblets 110 may be spaced apart such that adjacent partially submerged periodic riblets 110 do not intersect. For example, each valley 114 between each partially submerged periodic riblet 110 may be a flat or rounded valley surface. In certain embodiments, one or more valleys 114 of one or more partially submerged periodic riblets 110 may form a pointed tip.

Although physical object 100 of FIG. 1A illustrates a particular number of partially submerged periodic riblets 110, peaks 112, valleys 114, first portions 120, smooth surfaces 122, transition surfaces 124, second portions 130, ribbed surfaces 132, transition surfaces 134, transition surfaces 136, third portions 140, smooth surfaces 142, and transition surfaces 144, this disclosure contemplates any suitable number of partially submerged periodic riblets 110, peaks 112, valleys 114, first portions 120, smooth surfaces 122, transition surfaces 124, second portions 130, ribbed surfaces 132, transition surfaces 134, transition surfaces 136, third portions 140, smooth surfaces 142, and transition surfaces 144. For example, physical object 100 of FIG. 1A may include a fourth portion with a partially submerged ribbed surface adjacent to third portion 140 having smooth surface 142.

Although physical object 100 of FIG. 1A illustrates a particular arrangement of partially submerged periodic riblets 110, peaks 112, valleys 114, first portion 120, smooth surface 122, transition surface 124, second portion 130, ribbed surface 132, transition surface 134, transition surface 136, third portion 140, smooth surface 142, and transition surface 144, this disclosure contemplates any suitable arrangement of partially submerged periodic riblets 110, peaks 112, valleys 114, first portion 120, smooth surface 122, transition surface 124, second portion 130, ribbed surface 132, transition surface 134, transition surface 136, third portion 140, smooth surface 142, and transition surface 144. For example, smooth surface 142 of third portion 140 may be at a different plane than smooth surface 122 of first portion 120.

Figure 1B:
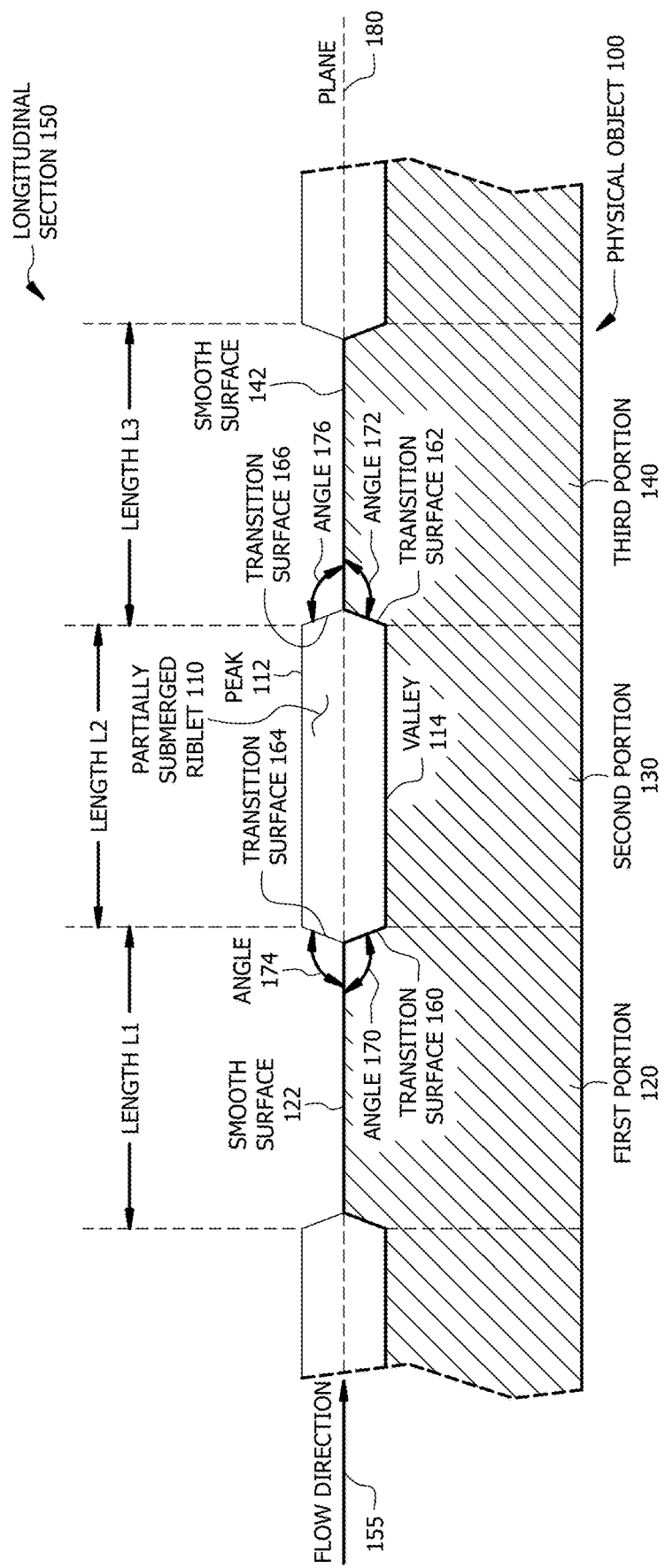
FIG. 1B illustrates a longitudinal section of the physical object of FIG. 1A, in accordance with an example embodiment.

FIG. 1B illustrates an example longitudinal section 150 of physical object 100 of FIG. 1A. Longitudinal section 150 of FIG. 1B is cut through surface 122 of first portion 120, valley 114 of second portion 130, and smooth surface 142 of third portion 140. First portion 120 of physical object 100 has a length L1, second portion 120 of physical object 100 has a length L2, and third portion 140 of physical object 100 has a length L3. In the illustrated embodiment of FIG. 1B, each partially submerged periodic riblet 110 of second portion 130 has approximately (within ten percent) a same length L2. In some embodiments, one or more submerged periodic riblets 110 of second portion 130 may have different lengths.

In the illustrated embodiment of FIG. 1B, length L1 of first portion 120 is approximately the same as length L2 of second portion 130 and length L3 of third portion 140 is approximately the same as length L2 of second portion 130. While length L1, length L2, and length L3 in the illustrated embodiment of FIG. 1B are approximately the same length, length L1, length L2, and length L3 may be any suitable length. For example, length L1, length L2, and/or length L3 may vary by a factor of two.

Length L2 of partially submerged periodic riblets 110 of physical object 100 runs parallel to a flow direction 155. For example, physical object 100 may be a wing of an aircraft, and length L2 of partially submerged periodic riblets 110 of physical object 100 may run parallel to flow direction 155 generated by the aircraft when the aircraft is in flight. In the illustrated embodiment of FIG. 1B, peak 112 of submerged periodic riblet 110 is above plane 180 of smooth surface 122 of physical object 100 and valley 114 of submerged periodic riblet 110 is below plane 180 of smooth surface 122.

First portion 120 of physical object 100 includes a transition surface 160. Transition surface 160 is located below plane 180 of smooth surface 122 of first portion 120. An angle 170 between transition surface 160 of first portion 120 of physical object 100 and smooth surface 122 of first portion 120 of physical object 100 is within a range of 90 degrees to 155 degrees (e.g., 135 degrees.) Third portion 140 of physical object 100 includes a transition surface 162. Transition surface 162 is located below plane 180 of smooth surface 142 of first portion 140. An angle between transition surface 162 of third portion 140 of physical object 100 and smooth surface 142 of third portion 140 of physical object 100 is within a range of 90 degrees to 155 degrees (e.g., 135 degrees.)

Second portion 130 of physical object 100 includes a transition surface 164 at a first end of each peak 112 of each partially submerged periodic riblet 110. Transition surface 164 of second portion 130 is located above plane 180 of smooth surface 122 of first portion 120. Transition surface 164 of second portion 130 intersects smooth surface 122 of first portion 120 such that an edge of transition surface 164 is created along smooth surface 122 of first portion 120. An angle 174 between transition surface 164 of second portion 130 of physical object 100 and smooth surface 122 of first portion 120 of physical object 100 is within a range of 90 degrees to 155 degrees (e.g., 135 degrees.)

Second portion 130 of physical object 100 includes a transition surface 166 at a second end of each peak 112 of each partially submerged periodic riblet 110. Transition surface 166 of second portion 130 is located above plane 180 of smooth surface 122 of first portion 120. Transition surface 166 of second portion 130 intersects smooth surface 142 of third portion 140 such that an edge of transition surface 136 is created along smooth surface 142 of third portion 140. An angle 176 between transition surface 166 of second portion 130 of physical object 100 and smooth surface 142 of third portion 140 of physical object 100 is within a range of 90 degrees to 155 degrees (e.g., 135 degrees.)

In certain embodiments, the intermittent pattern created by smooth surface 122 of first portion 120, partially submerged periodic riblets 110 of second portion 130, and smooth surface 142 of third portion 140 repeats along a predetermined length. For example, this intermittent pattern may repeat along the width of an airplane wing. Length L1, length L2, and length L3 are measured from the center of transition surfaces between each portion of physical object 100. As illustrated in FIG. 1B, length L2 is measured from the center of transition surface 160 to the center of transition surface 162 along plane 180 of smooth surface 122 of physical object 100.

Partially submerged riblets 110 are partially submerged below plane 180 to create a constant cross sectional area between the smooth regions (e.g., first portion 120 and third portion 140) and the riblet regions (e.g., second portion 130). For example, each peak 112 of each partially submerged riblet 110 may be located a predetermined distance above plane 180 of smooth surface 122 and each valley 114 of each partially submerged riblet 110 may be located the same predetermined distance below plane 180 of smooth surface 122 such that the surface area created by partially submerged periodic riblets 110 is the same above and below plane 180. In certain embodiments, a volume of the upper portion of partially submerged periodic riblets 110 above plane 180 of smooth surface 122 of first portion 120 of physical object 100 is approximately (within ten percent) equal to a volume of a void created by partially submerged periodic riblets 110 below plane 180 of smooth surface 122 of first portion 120 of physical object 100. Maintaining a constant cross-sectional area of partially submerged periodic riblets 110 in flow direction 155 reduces the pressure drag penalty as compared to other riblet patterns, as illustrated in FIGS. 3A, 3B, and 4 below.

FIG. 2A illustrates an example cross section 200 of a protruding riblet pattern 210. Protruding riblet pattern 210 is a pattern of protruding riblets 212 that protrude above a plane of an adjacent surface. For example, referring to the illustrated embodiment of FIG. 1A, protruding riblets 212 would be located above the plane of smooth surface 122 of first portion 120 of physical object 100 such that each valley between adjacent protruding riblets 212 may be located along the plane of smooth surface 122 of first portion 120 of physical object 100. A physical object having a ribbed surface of protruding riblets 212 experiences less friction drag when subjected to dynamic (e.g., aerodynamic or hydrodynamic) flow than a comparable physical object having a smooth surface. However, due to the geometry of protruding riblet pattern 210, a physical object having a ribbed surface of protruding riblets 212 experiences higher pressure drag when subjected to dynamic flow than a comparable physical object having a smooth surface.

In the illustrated embodiment of FIG. 2A, protruding riblet pattern 210 protrudes above baseline 220. Baseline 220 is equivalent to a plane of an adjacent surface (e.g., smooth surface 122 of FIG. 1A). Protruding riblet pattern 210 of FIG. 2A is a sawtooth pattern. Each protruding riblet 212 of protruding riblet pattern 210 has a peak 214. Peak 214 of each protruding riblet 212 has a height relative to baseline 220 of less than 0.002 inches. In certain embodiments, the height of each peak 214 of each protruding riblet 212 may be within a range of 0.001 inches to 0.002 inches (e.g., 0.0018 inches). Each peak 214 of each protruding riblet 212 forms an angle 230. Angle 230 may range from 45 degrees to 135 degrees. In the illustrated embodiment of FIG. 2A, angle 230 is 90 degrees. In certain embodiments, each protruding riblet 212 may be a two-dimensional (2D), thin plate riblet that is perpendicular to and located above baseline 220 of cross section 200. The 2D, thin plate riblets may create a series of channels with thin blades defining the channel walls.

Adjacent protruding riblets 212 of protruding riblet pattern 210 form valleys 216. Each valley 216 of each protruding riblet 212 is located at baseline 220. Each valley 216 forms an angle 240. Angle 240 may range from 45 degrees to 135 degrees. In the illustrated embodiment of FIG. 2A, angle 240 is 90 degrees. In some embodiments, one or more valleys 216 may be located above baseline 220. For example, each valley 216 of each protruding riblet 212 may be located 0.0002 inches above baseline 220.

Each protruding riblet 212 of protruding riblet pattern 210 of FIG. 2A is in the shape of a triangle. Each protruding riblet 212 may be equal in size, shape, and/or orientation relative to baseline 220. In the illustrated embodiment of FIG. 2A, each protruding riblet 212 of protruding riblet pattern 210 has two sides 242 and a base 244. Each side 242 of each protruding riblet 212 has a length less than 0.004 inches. In certain embodiments, the length of each side 242 of each protruding riblet 212 of protruding riblet pattern 210 is within a range of 0.002 inches to 0.003 inches (e.g., 0.0025 inches). Each base 244 of each protruding riblet 212 has a length less than 0.004 inches. In certain embodiments, the length of each base 244 of each protruding riblet 212 of protruding riblet pattern 210 is within a range of 0.003 inches to 0.004 inches (e.g., 0.0035 inches).

Although cross section 200 of FIG. 2A illustrates a particular number of protruding riblets 212, peaks 214, and valleys 216, this disclosure contemplates any suitable number of protruding riblets 212, peaks 214, and valleys 216. For example, protruding riblet pattern 210 of FIG. 2A may include more or less than seven protruding riblets 212. Although cross section 200 of FIG. 2A illustrates a particular arrangement of protruding riblets 212, peaks 214, and valleys 216, this disclosure contemplates any suitable arrangement of protruding riblets 212, peaks 214, and valleys 216. For example, two or more protruding riblets 212 of FIG. 2A may have different sizes, shapes, and/or orientations. As another example, two or more peaks 214 of two or more protruding riblets 212 may have different heights above baseline 220. As still another example, one or more peaks 214 and/or valleys 216 of one or more protruding riblets 212 may have a rounded point. As yet another example, the length of sides 242 and base 244 may be the same to form equilateral triangles.

As illustrated in cross section 200 of FIG. 2A, the geometry of a physical object that uses protruding riblet pattern 210 increases the wetted area as compared to a smooth surface. As such, while a physical object with a protruding riblet pattern 210 experiences less friction drag when subjected to dynamic flow than a comparable physical object having a smooth surface, the pressure drag increases due to the increased projected area in the flow direction.

FIG. 2B illustrates an example cross section 250 of a partially submerged riblet pattern 260. Partially submerged riblet pattern 260 is a pattern of repeating partially submerged riblets that are located partially above and partially below a plane of an adjacent surface. For example, partially submerged periodic riblets 262 may be equivalent to partially submerged periodic riblets 110 of FIG. 1A, which are located partially above and partially below the plane of smooth surface 122 of first portion 120 of physical object 100. A physical object with a partially submerged ribbed surface that uses partially submerged riblet pattern 260 experiences less friction drag when subjected to dynamic flow than a comparable physical object having a smooth surface. While a physical object with a partially submerged ribbed surface that uses partially submerged riblet pattern 260 experiences higher pressure drag when subjected to dynamic flow than a comparable physical object having a smooth surface, the pressure drag created by partially submerged riblet pattern 260 is significantly less than the pressure drag created by protruding riblet pattern 210 of FIG. 2A.

In the illustrated embodiment of FIG. 2B, partially submerged riblet pattern 260 is partially submerged below baseline 270. Baseline 270 is equivalent to a plane of an adjacent surface (e.g., smooth surface 122 of FIG. 1A). Partially submerged riblet pattern 260 of FIG. 2B is a sawtooth pattern. Each partially submerged riblet 262 of partially submerged riblet pattern 250 has a peak 264 located above baseline 270. Each peak 264 of each partially submerged riblet 262 has a height relative to baseline 270 of less than 0.001 inches. Each peak 264 forms an angle 280. Angle 280 may range from 45 degrees to 135 degrees. In the illustrated embodiment of FIG. 2B, angle 280 is 90 degrees.

Adjacent partially submerged riblets 262 of partially submerged riblet pattern 260 form valleys 266. Each valley 266 of each partially submerged riblet 262 has a depth relative to baseline 270 of less than 0.001 inches. Each valley 266 of each partially submerged riblet 262 forms by an angle 290. Angle 290 may range from 45 degrees to 135 degrees. In the illustrated embodiment of FIG. 2B, angle 290 is 90 degrees.

Each partially submerged riblet 262 of partially submerged riblet pattern 260 of FIG. 2B is in the shape of a triangle. Each partially submerged riblet 262 may be equal in size, shape, and/or orientation. Each partially submerged riblet 262 of partially submerged riblet pattern 260 has two sides 292 and a base 294. Each side 292 of each partially submerged riblet 262 has a length less than 0.004 inches. In certain embodiments, the length of each side 292 of each partially submerged riblet 262 of partially submerged riblet pattern 260 is within a range of 0.002 inches to 0.003 inches (e.g., 0.0025 inches). Each base 294 of each partially submerged riblet 262 has a length less than 0.004 inches. In certain embodiments, the length of each base 294 of each partially submerged riblet 262 of partially submerged riblet pattern 260 is within a range of 0.003 inches to 0.004 inches (e.g., 0.0035 inches).

The sizes of partially submerged riblets 262 depends on the application of partially submerged riblet pattern 260. For example, the sizes of each partially submerged riblet 262 may depend on the speed of fluid, the viscosity and/or density of the fluid, the scale of the object (e.g., physical object 100 of FIG. 1), etc. In certain applications, partially submerged riblets 262 are less than a hundredth of an inch in depth. For a highly viscous fluid (e.g., oil), partially submerged riblets 262 may be greater than a hundredth of an inch in depth. In certain embodiments, partially submerged riblets 262 may be sized using turbulent wall scaling. For example, partially submerged riblets 262 may be sized according to the following formula: non-dimensional scaling h+=(height)*sqrt((density)*(wall shear stress))/(viscosity), where h+ may be set to a value between 5 and 16. As another example, partially submerged riblets 262 may be sized according to the following formula: nondimensional spanwise spacing s+=(height)*sqrt((density)*(wall shear stress))/(viscosity), where s+ may be set to a value between 8 and 25.

Although cross section 250 of FIG. 2B illustrates a particular number of partially submerged riblets 262, peaks 264, and valleys 266, this disclosure contemplates any suitable number of partially submerged riblets 262, peaks 264, and valleys 266. For example, partially submerged riblet pattern 260 of FIG. 2B may include more or less than seven partially submerged riblets 262. Although cross section 250 of FIG. 2B illustrates a particular arrangement of partially submerged riblets 262, peaks 264, and valleys 266, this disclosure contemplates any suitable arrangement of partially submerged riblets 262, peaks 264, and valleys 266. For example, two or more partially submerged riblets 262 of FIG. 2B may have different sizes, shapes, and/or orientations. As another example, two or more valleys 266 between adjacent partially submerged riblets 262 may have different depths below baseline 270. As still another example, the length of sides 292 and base 294 of one or more partially submerged riblets 262 may be the same to form equilateral triangles.

FIG. 3A illustrates an example pressure pattern 300 associated with a protruding riblet pattern 340 (e.g., protruding riblet pattern 210 of FIG. 2A). Pressure pattern 300 was created using a simulation of a small scale structure 310 representative of a physical object (e.g., physical object 100 of FIG. 1A). The simulation was performed in a low Reynolds number channel with limited spanwise and streamwise extent. The effects of the pressure gradients illustrated in FIG. 3A were assessed from a highly resolved computational large eddy simulation of the riblet configuration in a channel flow. The simulation mimics the flow of a fluid (e.g., a liquid or gas) on a surface having a protruding riblet pattern. The flow direction 305 is parallel to the protruding riblets of protruding riblet pattern 340. The output of the simulation is displayed in FIG. 3A as pressure pattern 300.

Structure 310 of pressure pattern 300 includes smooth surfaces 320 similar to smooth surfaces 122 and 142 of FIG. 1A. Structure 310 of pressure pattern 300 includes protruding ribbed surfaces 330 that protrude above the plane of smooth surfaces 320. Protruding ribbed surfaces 330 form protruding riblet pattern 340. In the illustrated embodiment of FIG. 3A, protruding riblet pattern 340 is a sawtooth pattern similar to protruding riblet pattern 210 of FIG. 2A.

Pressure pattern 300 of FIG. 3A shows a distribution of time averaged pressure coefficient (Cp) as generated by the simulation. Cp is a non-dimensional parameter defined as the ratio of a difference between a local pressure and a free stream pressure and a free stream dynamic pressure. A Cp value of zero indicates that the pressure at a particular point is the same as the free stream pressure, a Cp value of one indicates a stagnation point, and a Cp value less than zero indicates that the local velocity is greater than the free stream velocity. In the illustrated embodiment of FIG. 3A, Cp represents a time average pressure taken over a predetermined amount of time. Cp is represented as a grayscale in the embodiment of FIG. 3A. The lowest Cp value (i.e., −0.040) is the darkest shade in the grayscale and the highest Cp value (i.e., 0.040) is the lightest shade in the grayscale. As such, the grayscale lightens in shade as the Cp value increases.

As indicated by the different shades of gray in pressure output pattern 300 of FIG. 3A, protruding riblet pattern 340 produces a large variant of Cp values ranging from −0.040 to 0.040. The highest Cp values are generated in forward facing transition regions 344 between smooth surfaces 320 and protruding riblet surfaces 330 as the flow travels in flow direction 305 from smooth surfaces 320 to protruding riblet surfaces 330. The lowest Cp values are generated in aft facing transition regions 346 between smooth surfaces 320 and protruding riblet surfaces 330 as the flow travels in flow direction 305 from protruding ribbed surfaces 330 to smooth surfaces 320. The submerged riblet pattern mitigates these pressure differentials by producing a more constant pressure over the surfaces of the structure, as described below in FIG. 3B.

FIG. 3B illustrates an example pressure pattern 350 associated with a partially submerged riblet pattern 390 (e.g., partially submerged riblet pattern 260 of FIG. 2B). Pressure pattern 350 was created using the same simulation technique of FIG. 3A. The flow direction 355 is parallel to the partially submerged riblets of partially submerged riblet pattern 390. The output of the simulation is displayed in FIG. 3B as pressure pattern 350.

Structure 360 of pressure pattern 350 includes smooth surfaces 370 similar to smooth surfaces 122 and 142 of FIG. 1A. Structure 360 of pressure pattern 350 includes partially submerged ribbed surfaces 380 that are partially recessed below the plane of smooth surfaces 370. Partially submerged ribbed surfaces 380 form partially submerged riblet pattern 390. In the illustrated embodiment of FIG. 3B, partially submerged riblet pattern 390 is a sawtooth pattern similar to partially submerged riblet pattern 260 of FIG. 2B.

As indicated by the different shades of gray in pressure output pattern 350 of FIG. 3B, partially submerged riblet pattern 390 produces a small variant of Cp values ranging from −0.008 to 0.008. Positive Cp values of approximately 0.008 are generated along partially submerged ribbed surfaces 380 and negative Cp values of approximately −0.008 are generated along smooth surfaces 370. The highest Cp values are generated in transition regions 394 between smooth surfaces 320 and protruding riblet surfaces 330 as the flow travels in flow direction 355 from smooth surfaces 320 to protruding riblet surfaces 330. The lowest Cp values are generated in transition regions 396 between smooth surfaces 320 and protruding riblet surfaces 330 as the flow travels in flow direction 305 from protruding ribbed surfaces 330 to smooth surfaces 320. As such, partially submerged riblet pattern 390 shown in FIG. 3B mitigates the pressure differentials shown in pressure pattern 300 of FIG. 3A by producing more constant pressures over the surfaces of structure 360.

FIG. 4 illustrates an example bar chart 400 that compares drag produced by a physical object having a protruding riblet pattern to a physical object having a partially submerged riblet pattern. The pressure drag and viscous drag increments are calculated from a time average of the forces in a computational large eddy simulation of the flow in a channel with constant cross section in the spanwise direction. Periodic boundary conditions are applied in the spanwise direction to approximate a 2D channel flow of infinite span. The simulation includes a smooth surface on one wall of the channel and a riblet wall on the opposing channel wall. The difference in the drag components between the smooth wall and the riblet wall provides the increments shown in FIG. 4.

Bar chart 400 includes drag differences for a protruding riblet pattern 410 and a partially submerged riblet pattern 420. Protruding riblet pattern 410 is equivalent to protruding riblet pattern 210 of FIG. 2A. Partially submerged riblet pattern 410 is equivalent to partially submerged riblet pattern 260 of FIG. 2B. The drag for protruding riblet pattern 410 and partially submerged riblet pattern 420 is measured as a percentage difference from the drag generated by a smooth surface without riblets. Pressure drag differences, friction (e.g., viscous) drag differences, and total drag differences are provided in bar chart 400.

Protruding riblet pattern 410, as illustrated in bar chart 400 of FIG. 4, generates a percent pressure drag difference 412 of positive seven percent, which indicates that protruding riblet pattern 410 generates a pressure drag that is seven percent greater than the negligible pressure drag generated by a smooth surface. Protruding riblet pattern 410 generates a percent viscous drag difference 414 of negative five percent, which indicates that protruding riblet pattern 410 generates a viscous drag that is five percent lower than the viscous drag generated by a smooth surface. The total drag difference, which is calculated by adding pressure drag difference 412 and viscous drag difference 414 of protruding riblet pattern 410, is positive two percent, which indicates that protruding riblet pattern 410 generates a total drag that is two percent higher than the total drag generated by a smooth surface. Thus, while protruding riblet pattern 410 is effective at reducing viscous drag as compared to a smooth surface without riblets, protruding riblet pattern 410 increases the overall drag when taking into consideration pressure drag.

Partially submerged riblet pattern 420, as illustrated in bar chart 400 of FIG. 4, generates a percent pressure drag difference 422 of positive 0.1 percent, which indicates that partially submerged riblet pattern 420 generates a pressure drag that is 0.1 percent greater than the pressure drag generated by a smooth surface. Partially submerged riblet pattern 420 generates a percent viscous drag difference 424 of negative 2.8 percent, which indicates that partially submerged riblet pattern 420 generates a viscous drag that is 2.8 percent lower than the viscous drag generated by a smooth surface. The total drag difference, which is calculated by adding pressure drag difference 422 and viscous drag difference 424 of partially submerged riblet pattern 420, is negative 2.7 percent, which indicates that partially submerged riblet pattern 420 generates a total drag that is 2.7 percent lower than the total drag generated by a smooth surface. Thus, partially submerged riblet pattern 420 is effective at reducing viscous drag as compared to a smooth surface without riblets and is also effective at reducing the overall drag when taking into consideration both viscous drag and pressure drag.

FIG. 5 illustrates an example method 500 for reducing drag on a surface having a partially submerged riblet pattern, in accordance with an example embodiment. Method 500 starts at step 510. At step 520, a smooth surface (e.g., smooth surface 122 of FIG. 1A) is formed on a first portion (e.g., first portion 120 of FIG. 1A) of a physical object (e.g., physical object 100 of FIG. 1A). The physical object may be a component (e.g., a portion of an outer body) of an aircraft (e.g., an airplane, a helicopter, a blimp, a drone, etc.), a component of a of a marine vessel (e.g., a cargo ship, a passenger ship, a canoe, a raft, etc.), a component of a motorized vehicle (e.g., a truck, a car, a train, a scooter, etc.), a component of a non-motorized vehicle (e.g., a bicycle, a skateboard, etc.), a component of a spacecraft (e.g., a spaceship, a satellite, etc.), a wind turbine, a projectile (e.g., a missile), or any other physical object that is capable of experiencing drag. Method 500 then moves from step 520 to step 530.

At step 530 of method 500, periodic riblets (e.g., partially submerged periodic riblets of FIG. 1A) are formed on a second portion (e.g., second portion 130 of FIG. 1A) of the physical object. The second portion of the physical object is adjacent to the first portion of the physical object. In certain embodiments, each riblet of the periodic riblets has a same length. The smooth surface of the first portion of the physical object may have a same length as the periodic riblets, as measured in the direction of the length of the periodic riblets.

Method 500 then moves from step 530 to step 540, where each peak of each riblet of the periodic riblets of the second portion of the physical object is formed above a plane of the smooth surface of the first portion of the physical object. The peak of each riblet of the periodic riblets may be at a same level above the smooth surface of the first portion of the physical object. In certain embodiments, a constant distance is formed between each peak (e.g., peaks 112 of FIG. 1A) of each riblet of the periodic riblets such that that the distance between each peak is the same. Method 500 then moves from step 540 to step 545.

At step 545, each valley (e.g., valleys 114 of FIG. 1A) between adjacent riblets of the periodic riblets of the second portion of the physical object is formed below the plane of the smooth surface of the first portion of the physical object. Each valley between the periodic riblets may be at a same level below the smooth surface of the first portion of the physical object. In certain embodiments, a constant distance is formed between each valley of each riblet of the periodic riblets such that that the distance between each valley is the same. Method 500 them moves from step 540 to step 550.

At step 550, a flow is generated over the periodic riblets of the second portion of the physical object and over the smooth surface of the first portion of the physical object. For example, the flow may be generated by an airplane moving through the air at a predetermined speed. The flow direction (e.g., flow direction 335 of FIG. 3B) runs parallel to the length of each riblet of the periodic riblets. Method 500 then moves from step 550 to step 560, where method 500 determines whether the flow is a gas or a liquid.

If the flow is a gas (e.g., air), method 500 moves from step 560 to step 570, where an aerodynamic drag is generated over the partially submerged riblet pattern that is less than the total aerodynamic drag (i.e., pressure drag and viscous drag) produced by generating a flow over a smooth surface without riblets. As indicated in FIG. 4 above, the aerodynamic drag generated over the partially submerged riblet pattern that is less than the total aerodynamic drag produced by generating a flow over a protruding riblet pattern (e.g., protruding riblet pattern 410 of FIG. 4). As such, the partially submerged riblet pattern reduces drag over aerodynamic surfaces, which may reduce fuel costs and increase range in vehicles (e.g., aircraft) utilizing the partially submerged riblet pattern.

If the flow is a liquid (e.g., water), method 500 advances from step 560 to step 580, where a hydrodynamic drag is generated over the partially submerged riblet pattern that is less than the total hydrodynamic drag (i.e., pressure drag and viscous drag) produced by generating a flow over a smooth surface without riblets. As indicated in FIG. 4 above, the hydrodynamic drag generated over the partially submerged riblet pattern that is less than the total hydrodynamic drag produced by generating a flow over a protruding riblet pattern (e.g., protruding riblet pattern 410 of FIG. 4). As such, the partially submerged riblet pattern reduces drag over hydrodynamic surfaces, which may reduce fuel costs and increase range in vehicles (e.g., marine vessels) utilizing the partially submerged riblet pattern. Method 500 then moves from steps 570 and 580 to step 590, where method 500 ends.

Modifications, additions, or omissions may be made to method 500 depicted in FIG. 5. Method 500 may include more, fewer, or other steps. For example, method 500 may include forming each peak of each riblet of the periodic riblets at an angle between 45 degrees and 135 degrees (e.g., 90 degrees.) As another example, method 500 may include forming each valley between adjacent riblets of the periodic riblets at an angle between 45 degrees and 135 degrees (e.g., 90 degrees.) As still another example, method 500 may repeat steps 520 through 540 to form an intermittent pattern along a predetermined length of a component (e.g., an aircraft wing.)

Steps of method 500 depicted in FIG. 5 may be performed in parallel or in any suitable order. For example, step 520 directed to forming a smooth surface on a first portion of a physical object and step 530 directed to forming periodic riblets on a second portion of the physical object may be reversed. Any suitable component may perform any step of method 500. For example, one or more machines (e.g., robotic machines) may be used to form one or more surfaces of the physical object.

Embodiments of this disclosure may be applied to any fluid flow application where the boundary layer is turbulent and skin friction is significant. For example, embodiments of this disclosure may be used to reduce internal flow drag in propulsion systems, reduce pipe flow drag, reduce drag in automotive systems, and the like.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for reducing drag, comprising:
   forming a smooth surface on a first portion of a physical object;
   forming periodic riblets on a second portion of the physical object; and
   generating a flow over the periodic riblets of the second portion of the physical object and over the smooth surface of the first portion of the physical object;
   wherein:
      the second portion of the physical object is adjacent to the first portion of the physical object;
      each peak of each riblet of the periodic riblets of the second portion of the physical object is located above a plane of the smooth surface of the first portion of the physical object;
      each valley between adjacent riblets of the periodic riblets of the second portion of the physical object is located below the plane of the smooth surface of the first portion of the physical object; and
      a length of each riblet of the periodic riblets runs parallel to a direction of the flow.

2. The method of claim 1, wherein a cross sectional area in the direction of the flow of the first portion of the physical object is approximately equal to a cross sectional area of the second portion of the physical object in the direction of the flow.

3. The method of claim 1, further comprising:
   forming each peak of each riblet of the periodic riblets at a same distance above the plane of the smooth surface of the first portion of the physical object; and
   forming each valley between adjacent riblets of the periodic riblets at the same distance below the plane of the smooth surface of the first portion of the physical object.

4. The method of claim 1, further comprising:
   forming each riblet of the periodic riblets at a same length; and forming the smooth surface of the first portion of the physical object at the same length as the periodic riblets.

5. The method of claim 1, wherein:
a maximum height of each riblet of the periodic riblets is less than 0.002 inches;
a maximum width of each riblet of the periodic riblets is less than 0.004 inches; and
a length of each riblet of the periodic riblets is within a range of 10 to 50 times longer than the maximum height of each respective riblet.

6. The method of claim 1, wherein:
the first portion of the physical object further comprises a first transition surface;
an angle between the transition surface of the first portion of the physical object and the smooth surface of the first portion of the physical object is within a range of 90 degrees to 155 degrees;
the second portion of the physical object further comprises a second transition surface; and
an angle between the second transition surface of the second portion of the physical object and the smooth surface of the first portion of the physical object is within a range of 90 degrees to 155 degrees.

7. The method of claim 1, wherein the physical object is associated with one of the following:
an aircraft;
a marine vessel;
a vehicle;
a pipeline;
a wind turbine; and
a projectile.

8. A physical object, comprising:
a first portion comprising a smooth surface; and
a second portion comprising periodic riblets, wherein:
the second portion of the physical object is adjacent to the first portion of the physical object;
each peak of each riblet of the periodic riblets of the second portion of the physical object is located above a plane of the smooth surface of the first portion of the physical object; and
each valley between adjacent riblets of the periodic riblets of the second portion of the physical object is located below the plane of the smooth surface of the first portion of the physical object.

9. The physical object of claim 8, wherein a cross sectional area of the first portion of the physical object is approximately equal to a cross sectional area of the second portion of the physical object.

10. The physical object of claim 8, wherein:
each peak of each riblet of the periodic riblets is at a same distance above the plane of the smooth surface of the first portion of the physical object; and
each valley between adjacent riblets of the periodic riblets is at the same distance below the plane of the smooth surface of the first portion of the physical object.

11. The physical object of claim 8, wherein:
each riblet of the periodic riblets has a same length; and
the length of the periodic riblets is the same as a length of the smooth surface of the first portion of the physical object.

12. The physical object of claim 8, wherein:
a maximum height of each riblet of the periodic riblets is less than 0.002 inches;
a maximum width of each riblet of the periodic riblets is less than 0.004 inches; and
a length of each riblet of the periodic riblets is within a range of 10 to 50 times longer than the maximum height of each respective riblet.

13. The physical object of claim 8, wherein:
the first portion of the physical object further comprises a first transition surface;
an angle between the transition surface of the first portion of the physical object and the smooth surface of the first portion of the physical object is within a range of 90 degrees to 155 degrees;
the second portion of the physical object further comprises a second transition surface; and
an angle between the second transition surface of the second portion of the physical object and the smooth surface of the first portion of the physical object is within a range of 90 degrees to 155 degrees.

14. The physical object of claim 8, wherein the physical object is associated with one of the following:
an aircraft;
a marine vessel;
a vehicle;
a pipeline;
a wind turbine; and
a projectile.

15. A method of manufacturing a physical object, comprising:
forming a smooth surface on a first portion of the physical object; and
forming periodic riblets on a second portion of the physical object;
wherein:
the second portion of the physical object is adjacent to the first portion of the physical object;
each peak of each riblet of the periodic riblets of the second portion of the physical object is located above a plane of the smooth surface of the first portion of the physical object; and
each valley between adjacent riblets of the periodic riblets of the second portion of the physical object is located below the plane of the smooth surface of the first portion of the physical object.

16. The method of claim 15, wherein a cross sectional area of the first portion of the physical object is approximately equal to a cross sectional area of the second portion of the physical object.

17. The method of claim 15, further comprising:
forming each peak of each riblet of the periodic riblets at a same distance above the plane of the smooth surface of the first portion of the physical object; and
forming each valley between adjacent riblets of the periodic riblets at the same distance below the plane of the smooth surface of the first portion of the physical object.

18. The method of claim 15, further comprising:
forming each riblet of the periodic riblets at a same length; and
forming the smooth surface of the first portion of the physical object at the same length as the periodic riblets.

19. The method of claim 15, wherein:
a maximum height of each riblet of the periodic riblets is less than 0.002 inches;
a maximum width of each riblet of the periodic riblets is less than 0.004 inches; and
a length of each riblet of the periodic riblets is within a range of 10 to 50 times longer than the maximum height of each respective riblet.

20. The method of claim 15, wherein:

the first portion of the physical object further comprises a first transition surface;

an angle between the transition surface of the first portion of the physical object and the smooth surface of the first portion of the physical object is within a range of 90 degrees to 155 degrees;

the second portion of the physical object further comprises a second transition surface; and an angle between the second transition surface of the second portion of the physical object and the smooth surface of the first portion of the physical object is within a range of 90 degrees to 155 degrees.

\* \* \* \* \*